Sept. 26, 1967     S. J. CISLO     3,343,857
BALL JOINT CONSTRUCTION
Filed Dec. 18, 1964
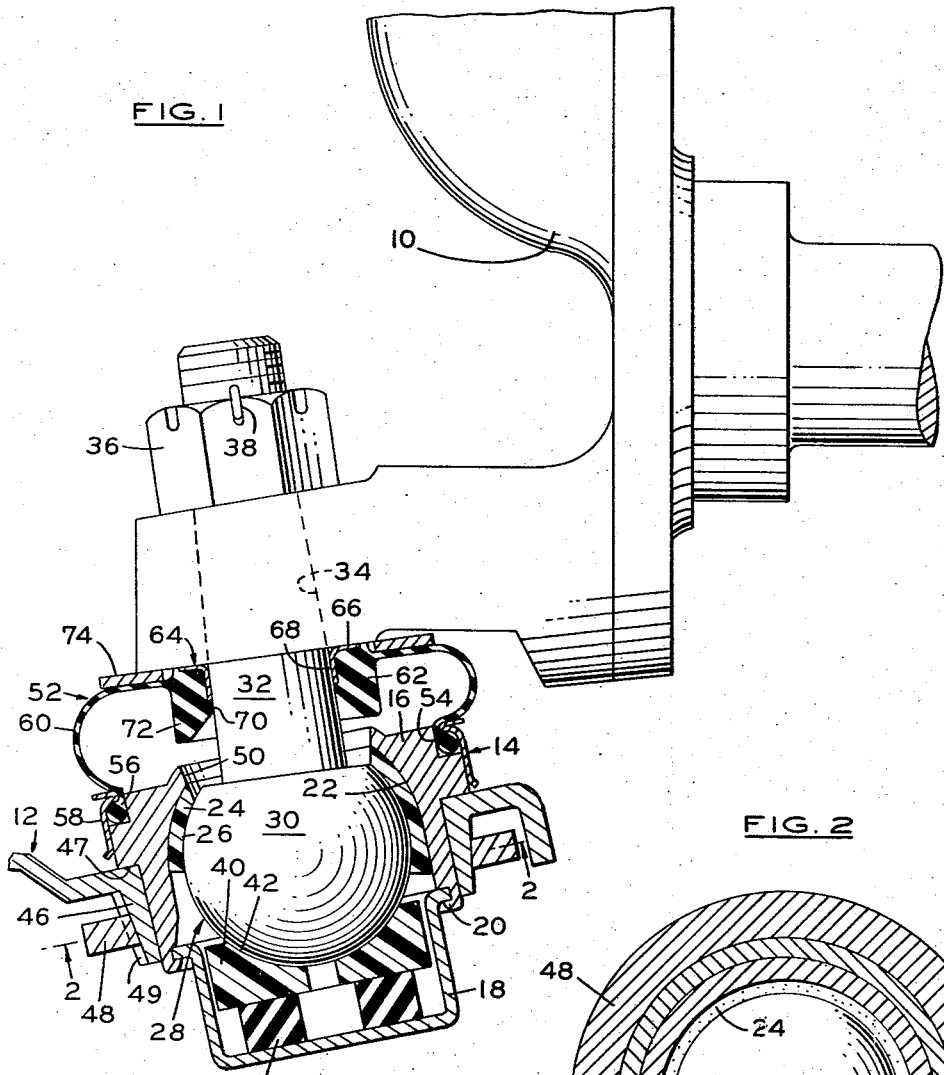
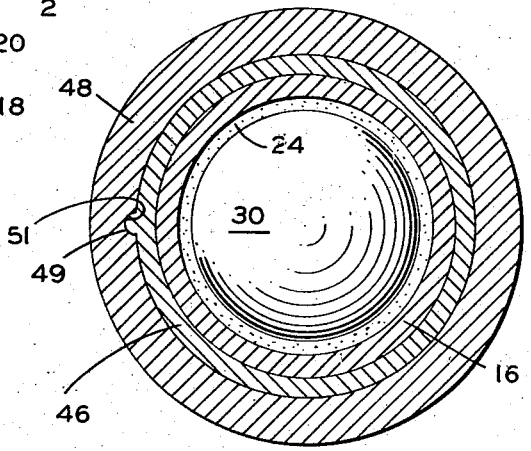
STANLEY J. CISLO
*INVENTOR*
BY John R. Faulkner
Clifford L. Sadler
*ATTORNEYS*

United States Patent Office 3,343,857
Patented Sept. 26, 1967

3,343,857
BALL JOINT CONSTRUCTION
Stanley J. Cislo, Detroit, Mich., assignor to Ford Motor Company, Dearborn, Mich., a corporation of Delaware
Filed Dec. 18, 1964, Ser. No. 419,484
5 Claims. (Cl. 287—90)

The present invention relates generally to articulated joints and more particularly to the construction of a ball and socket joint.

Ball and socket joints provide an articulated connection between two relatively movable members. Joints of this type have a number of uses. They are commonly provided in vehicle suspension systems to connect a vehicle suspension arm to a wheel spindle. Ball joints are also used in the steering linkage of vehicles.

A ball joint usually comprises a spherical or semi-spherical socket and a stud with a one or two piece spherical head that is seated in the socket. These joints are lubricated with grease to provide low friction movement. In order to retain the lubricant within the socket and prevent entry of contaminating dirt that might damage the bearing surfaces, a boot seal is usually provided. Such a seal has a small opening at one end that surrounds the stud and a large opening at the other end which surrounds the socket.

In automotive suspension systems, ball joints of this type are used to interconnect the outer ends of the suspension arms with the wheel supporting spindle. The ball joint socket is secured to the arm and the stud is secured to the spindle. This permits jounce and rebound movement of the wheel and in addition permits steering of the wheel about an axis which passes through the center of the ball. It has been conventional practice prior to the present invention to secure the ball joint to the suspension arm by a plurality of rivets. While such construction provides a positive connection between the socket and the arm, it is relatively expensive, requiring separate operations for the riveting. In addition, considerable difficulty is encountered when it becomes necessary to replace the ball joint assembly. The mechanic is required to drill out or otherwise destroy the rivets in order to remove the socket. This sometimes results in permanent damage to the suspension arm and prevents its reuse.

In view of the state of the art, it is the principal object of the present invention to provide an improved ball joint assembly with a superior means for retaining the assembly in engagement with the suspension arm.

An added object of the present invention is to provide an improved construction that enables not only the rapid and simple mounting of the ball joint assembly, but which will also permit quick removal of the joint from the vehicle whenever replacement of the part is indicated, all of this being accomplished while retaining the unit sealed without danger that any of its component parts may be lost or misplaced during such mounting or dismounting.

A further object of the invention is to so construct the ball joint assembly and the end of the suspension arm to which the joint is intended to be mounted, whereby such mounting and dismounting may be had without in any way bending, springing, breaking, or otherwise damaging or rendering useless, such a construction permitting innumerable such replacements during the life of the vehicle and while retaining the original suspension arm.

There are many objects and advantages of the present invention that will become amply apparent upon consideration of the following discussion and the accompanying drawings in which:

FIGURE 1 is an elevational view partly in section of a portion of the vehicle suspension system having a ball and socket joint assembly constructed and secured in accordance with this invention; and FIGURE 2 is a sectional view taken along sectional lines 2—2 of FIGURE 1.

Referring to the drawings for a more complete understanding of the present invention, a ball joint assembly in the environment of a vehicle suspension system is illustrated for exemplary purposes. FIGURE 1 discloses a suspension system which includes a wheel spindle 10 and a suspension arm 12. A ball joint assembly 14 rotatably and tiltably connects spindle 10 with the suspension arm 12.

The ball joint assembly 14 includes an annular shaped upper socket part 16 and cup-shaped lower socket part 18. The socket part 16 is secured to the lower socket part 18 by a beaded-over portion 20 formed on one end of the socket 16. The internal surface 22 of the upper socket part 16 has a generally truncated spherical configuration. It is lined by an annular plastic bearing liner 24 which fits against the surface 22 and has an internal bearing surface 26. The bearing surface 26 also has a truncated spherical configuration.

A stud 28 has a ball portion 30 that is seated against the bearing surface 26 of the bearing liner 24. A shank portion 32 extends upwardly from the ball portion 30 of the stud 28. The shank 32 fits into a tapered bore 34 formed in the wheel spindle 10 and is held in place by a nut 36 and a cotter key 38.

A second plastic bearing element 40 is situated within the lower socket part 18 and has a bearing surface 42 which slidably engages the lower surface of the ball 30. The bearing element 40 is pressed toward the ball 30 by an annular rubber spring 44.

The suspension arm 12 is provided with an opening having a cylindrical portion 46 which receives the upper socket portion 16. The ball joint socket is press fitted into the opening formed by the cylindrical wall 46 until the shoulder 47 is seated against the arm 12. The outer surface of the wall 46 is tapered and engaged by the retaining ring 48. The ring 48 is jammed upwardly in a forcible manner, forcing the wall 46 inwardly against the socket 16 to retain it in a tight connection.

The wall 46 is provided with a ridge 49 that extends axially along one of its sides. The retaining ring 48 has a complementary notch 51 which engages the ridge 49. The engagement of the ridge 49 and the notch 51 ensures the correct alignment of the jam ring 48 with the wall 46. The upper end of the socket is provided with a large opening 50 to provide clearance for the shank portion 32 of the stud 28 when the ball portion 30 pivots on the bearing surfaces 26 and 42. The opening is sealed by a boot seal 52.

The boot seal assembly 52 has a generally annular configuration with a large opening 54 at its lower end that is defined by a rolled edge 56. The edge 56 is seated in a groove 57 formed on the exterior surface of the upper socket part 16 and is held in tight sealed engagement by a spring metal retainer 58.

The body 60 of the seal is of thin walled construction. This thin wall body 60 bulges outwardly and connects the lower edge 56 with an upper end of the seal 52 that is also of enlarged construction.

The annular enlargement 62 defines the opening of the seal 52 that surrounds the stud shank 32. A hat shaped washer 64 having a radial flange portion 66 and a cylindrical flange portion 68 is in tight engagement with the adjacent surface of the spindle 10 and the stud 32, respectively. A rib 70 extends radially inwardly at the lower extremity of the flange 68 to provide a tight sealed engagement against the surface of the stud shank 32. The enlargement 62 also includes an enlarged lip 72 that extends downwardly toward the open mouth 50 of the socket 16.

It will be noted from FIGURE 1 that the body portion 60 of the seal 52 intersects the enlarged portion 62 at a substantially right angle and is spaced from its upper edge by a small amount equal to the thickness of a washer 74. The washer 74 is provided to protect the thin body of the seal from being cut by the sharp machined edge of the adjacent portion of the spindle 10.

The upper and lower ends of the seals 52 are secured to the stud shank 32 and socket 16, respectively, so that when the spindle is rotated about the axis of the stud shank 32 during steering movement of the vehicle wheel, the rubber body portion 60 will flex and twist. Because it is a thin wall seal, this flexing and twisting occurs without injury to the rubber. The enlarged depending lip 72 keeps the seal wall 60 from becoming pinched between the stud shank 32 and the opening 50 during rotary steering movement of the spindle 10 as well as during vertical jounce and rebound movement.

The ball joint assembly is particularly characterized by the easy manner in which the socket 16 may be pressed into the arm and the ring 48 jammed into place. This construction provides a positive positioning of the ball joint assembly 14 and positively retains the joint in position.

Modifications and alterations of the present invention may occur to those skilled in the art which will come within the scope and spirit of the following claims.

1. A suspension arm, a wheel spindle, a ball joint assembly interconnecting said arm and said spindle for articulation therebetween, said assembly having a socket part secured to said arm and a stud part secured to said spindle, said arm having an opening defined by a wall having a cylindrical internal surface, said socket having an exterior cylindrical surface adapted to be fitted within said opening, said exterior surface having a slightly greater diameter than the diameter of said internal surface whereby said socket must be forcibly inserted into said opening, said wall having a tapered exterior surface, a jam ring positioned in engagement with said tapered wall so as to force said wall inwardly toward said socket, said tapered exterior surface having an axial rib, said jam ring having a notch in alignment with said axial rib.

2. A suspension arm, a wheel spindle, a ball joint assembly interconnecting said arm and said spindle, said assembly having a socket part secured to said arm and a stud part secured to said spindle, said arm having an opening defined by a wall having a cylindrical internal surface, said socket having an exterior cylindrical surface adapted to be fitted within said opening, said exterior surface having a slightly greater diameter than the diameter of said internal surface whereby said socket must be forcibly inserted into said opening, said wall having a slightly tapered exterior surface, a jam ring positioned in engagement with said tapered wall so as to force said wall inwardly toward said socket, said tapered exterior surface having an angle of taper sufficiently slight so that said jam ring is frictionally held securely in place on said wall.

3. A first part, a second part, a ball joint assembly interconnecting said first part and said second part for articulation therebetween, said assembly having a socket part secured to said first part and a stud part secured to said second part, said first part having an opening defined by a wall having a cylindrical internal surface, said socket having an exterior cylindrical surface adapted to be fitted within said opening, said exterior surface having a slightly greater diameter than the diameter of said internal surface whereby said socket must be forcibly inserted into said opening, said wall having a tapered exterior surface, a jam ring positioned in engagement with said tapered wall so as to force said wall inwardly toward said socket, said tapered exterior surface having an axial rib, said jam ring having a notch in alignment with said axial rib.

4. A first part, a second part, a ball joint assembly interconnecting said first part and said second part for articulation therebetween, said assembly having a socket part secured to said first part and a stud part secured to said second part, said first part having an opening defined by a wall having a cylindrical internal surface, said socket having an exterior cylindrical surface adapted to be fitted within said opening, said exterior surface having a slightly greater diameter than the diameter of said internal surface whereby said socket must be forcibly inserted into said opening, said wall having a slightly tapered exterior surface, a jam ring positioned in engagement with said tapered wall so as to force said wall inwardly toward said socket, said tapered exterior surface having an angle of taper sufficiently slight so that said jam ring is frictionally held securely in place on said wall.

5. A suspension arm, a wheel spindle, a ball joint assembly interconnecting said arm and said spindle for articulation therebetween, said assembly having a socket part secured to said arm and a stud part secured to said spindle, said arm having an opening defined by a wall having a cylindrical internal surface, said socket having an exterior cylindrical surface adapted to be fitted within said opening, said wall having a tapered exterior surface, a jam ring positioned in engagement with said tapered wall so as to force said wall inwardly toward said socket, said tapered exterior surface having an axial rib, said jam ring having a notch in alignment with said axial rib.

References Cited
UNITED STATES PATENTS

| | | | |
|---|---|---|---|
| 98,144 | 12/1869 | Buckman | 287—52.06 |
| 1,018,354 | 2/1912 | Fairfield | 285—158 |
| 3,239,256 | 3/1966 | Carter | 287—87 |
| 3,266,134 | 8/1966 | Moskovitz | 29—149.5 |

CARL W. TOMLIN, *Primary Examiner.*

A. V. KUNDRAT, *Assistant Examiner.*